United States Patent
Asahi et al.

[11] Patent Number: 5,859,926
[45] Date of Patent: Jan. 12, 1999

[54] DEVICE AND METHOD FOR DATA CODING AND DECODING

[75] Inventors: Tsunemori Asahi; Akinari Todoroki; Noboru Ninomiya, all of Nagano-ken, Japan

[73] Assignee: Seiko Epson Corporation, Tokyo, Japan

[21] Appl. No.: 748,420

[22] Filed: Nov. 13, 1996

[30] Foreign Application Priority Data

Nov. 13, 1995 [JP] Japan ................................. 7-294491

[51] Int. Cl.$^6$ .............................. G06K 9/00; G06K 9/36; G06K 9/54; H04M 1/417
[52] U.S. Cl. ....................... 382/166; 382/166; 382/247; 382/304; 382/238; 358/261.2; 358/261.1; 358/430; 358/514
[58] Field of Search ............................. 358/261.2, 261.1, 358/514, 518, 430; 382/304, 238, 166, 247

[56] References Cited

U.S. PATENT DOCUMENTS

| | | |
|---|---|---|
| 3,739,085 | 6/1973 | Rosen et al. .......................... 358/261.2 |
| 4,325,085 | 4/1982 | Gooch .................................. 358/261.1 |
| 4,652,856 | 3/1987 | Mohiuddin et al. . |
| 4,905,297 | 2/1990 | Langdon, Jr. et al. ............... 358/261.2 |
| 4,935,882 | 6/1990 | Pennebaker et al. . |

FOREIGN PATENT DOCUMENTS

| | | |
|---|---|---|
| A-62-185413 | 3/1987 | Japan . |
| A-63-74324 | 4/1988 | Japan . |
| A-63-76525 | 4/1988 | Japan . |
| A-6-276041 | 9/1994 | Japan . |

*Primary Examiner*—Edward L. Coles
*Assistant Examiner*—Twyler Lamb
*Attorney, Agent, or Firm*—Oliff & Berridge, PLC

[57] ABSTRACT

A data coding device codes input object color pixel data into coded data. The data coding device includes a parallel/serial converter that converts the object color pixel data composed of parallel data of multiple bits into serial data, a state signal generator that generates a states signal for each bit of the serial data and a prediction device which groups each bit of the serial data based on the state signal, and an arithmetic calculator that converts the color pixel data into coded data based on the data received from the prediction device. A corresponding data decoding device is also disclosed.

9 Claims, 14 Drawing Sheets

| STATE | ODR | PBP OUTPUT |
|---|---|---|
| 0 | * * * * | 14 |
| 1 | * * * 0<br>* * * 1 | 6<br>13 |
| 2 | * * 00<br>* * 01<br>* * 10<br>* * 11 | 2<br>5<br>9<br>12 |
| 3 | * 000<br>* 001<br>* 010<br>* 011<br>* 100<br>* 101<br>* 110<br>* 111 | 0<br>1<br>3<br>4<br>7<br>8<br>10<br>11 |

\* : UNFIXED (NO INPUT DATA YET)
ODR : STATE OF INPUT DATA
PBP : 1st STATE SIGNAL

FIG.5

| X | X | X | X | X | X |
|---|---|---|---|---|---|
| X | ● (1) | ● (2) | X | X | X |
| X | ● (3) | ○ | X | X | X |
| X | X | X | X | X | X |
| X | X | X | X | X | X |

○ : CONVERSION OBJECT PIXEL
● : REFERENCE PIXEL

FIG.6

| COMPARISON OF REFERENCE PIXEL VALUE | REFERENCE PIXEL STATE (SX) |
|---|---|
| ● (1) = ● (2) = ● (3) ⇒ | 0 |
| ● (1) = ● (2) ≠ ● (3) ⇒ | 1 |
| ● (1) ≠ ● (2) = ● (3) ⇒ | 2 |
| ● (1) = ● (2) ≠ ● (3) ⇒ | 3 |
| ● (1) ≠ ● (2) ≠ ● (3) ⇒ | 4 |

FIG.7

| STATE | ODR | PBP OUTPUT | | NEW NUMBER CX (NEW PBP NUMBER) |
|---|---|---|---|---|
| 0 | * * * * | 14 | ⇧ | 14 (7) |
| 1 | * * * 0<br>* * * 1 | 6<br>13 | ⇧<br>⇧ | 10 (5)<br>11 (5) |
| 2 | * * 00<br>* * 01<br>* * 10<br>* * 11 | 2<br>5<br>9<br>12 | ⇧<br>⇧<br>⇧<br>⇧ | 2 (1)<br>3 (1)<br>6 (3)<br>7 (3) |
| 3 | * 000<br>* 001<br>* 010<br>* 011<br>* 100<br>* 101<br>* 110<br>* 111 | 0<br>1<br>3<br>4<br>7<br>8<br>10<br>11 | ⇧<br>⇧<br>⇧<br>⇧<br>⇧<br>⇧<br>⇧<br>⇧ | 0 (0)<br>1 (0)<br>4 (2)<br>5 (2)<br>8 (4)<br>9 (4)<br>12 (6)<br>13 (6) |

*: UNFIXED (NO INPUT DATA YET)
ODR: STATE OF INPUT DATA
PBP: PRIMARY STATE SIGNAL
CX: SIGNAL TO DETERMINE OBJECT ROM

FIG.8

PBP AT TIME OF
PARALLEL PROCESSING

| STATE | ODR | PBP |
|---|---|---|
| 0 | ●●● ∗ | 7 |
| 1 | ∗ ∗ ∗ x | 5 |
| 2 | ∗ ∗ 0 x | 1 |
|   | ∗ ∗ 1 x | 3 |
| 3 | ∗ 00 x | 0 |
|   | ∗ 01 x | 2 |
|   | ∗ 10 x | 4 |
|   | ∗ 11 x | 6 |

● : 0 OR 1 (CONFIRMED COMPLETION)
∗ : UNFIXED (NO INPUT DATA YET)
x : 0 OR 1
ODR: INPUT DATA STATE
PBP: 1st STATE SIGNAL

FIG.9

| PBP | | SX | | | | |
|---|---|---|---|---|---|---|
|   |   | 0 | 1 | 2 | 3 | 4 |
| 0 | CX = 0 | 0 | 4 | 8 | C | 10 |
|   | CX = 1 | 1 | 5 | 9 | D | 11 |
| 1 | CX = 2 | 2 | 6 | A | E | 12 |
|   | CX = 3 | 3 | 7 | B | F | 13 |
| 2 | CX = 4 | 14 | | | | |
|   | CX = 5 | 15 | | | | |
| 3 | CX = 6 | 16 | | | | |
|   | CX = 7 | 17 | | | | |
| 4 | CX = 8 | 18 | | | | |
|   | CX = 9 | 19 | | | | |
| 5 | CX = A | 1A | | | | |
|   | CX = B | 1B | | | | |
| 6 | CX = C | 1C | | | | |
|   | CX = D | 1D | | | | |
| 7 | CX = E | 1E | | | | |
|   | CX = E | 1E | | | | |

PBP : 1st STATE SIGNAL
SX : 2nd STATE SIGNAL
CX : SIGNAL TO DETERMINE OBJECT ROM

FIG.10

| INDEX | CONVERSION FREQUENCY OF EACH COLOR SYMBOL | | | | | | |
|---|---|---|---|---|---|---|---|
| | A | B | C | D | E | ... | P |
| 0 | 64,936 | 15,882 | 26,320 | 7,669 | 5,634 | | 2,634 |
| 1 | 5,553 | 36,214 | 18,776 | 20,365 | 6,046 | | 953 |
| 2 | 33,365 | 18,247 | 22,563 | 4,423 | 10,012 | | 1,359 |
| 3 | 9,596 | 33 | 13,456 | 562 | 356 | | 224 |
| 4 | 11,236 | 36,877 | 25,650 | 1,096 | 532 | | 1,096 |
| 65535 | 4,963 | 15,689 | 45,678 | 2,236 | 3,326 | | 63,697 |

REFERENCE PIXEL PATTERN

A,B,C ... P: COLOR SYMBOL

FIG.13

| B | C |
|---|---|
| A | X |

X: CODING OBJECT PIXEL
A,B,C: REFERENCE PIXEL

FIG.15A

| CONDITION | Sx |
|---|---|
| A=B=C | S1 |
| A=B≠C | S2 |
| A=C≠B | S3 |
| A≠B=C | S4 |
| A≠B≠C | S5 |

FIG.15B

DEVICE AND METHOD FOR DATA CODING AND DECODING

BACKGROUND OF THE INVENTION

1. Field of the Invention

The invention relates to a data coding device and method, and a data decoding device and method; and more particularly it relates to an improved coding and decoding device and methods for color pixel data.

2. Description of Related Art

Since pixel data contain large quantities of information, if the pixel data are processed in its existent state, a large amount of memory capacity is required, the communication rate becomes slower, and impractical. Furthermore, compression technology of the picture image data becomes extremely important. Therefore compression technology for each type of data has been developed and brought into existence from the prior art.

In recent years, as one method of data compression, attention has been paid to technology which makes use of entropy coders and decoders. As one of the entropy coding and decoding technologies, utilization is made for example of arithmetic coding and decoding technology. The concept of this technology is revealed for example in laid open patent publication Sho 62-185413, laid open patent publication 63-74324, and laid open patent publication 63-76525.

FIG. 11 shows a conventional data coding system 50 and a data decoding system 60 which utilizes this type of technology.

The data coding system 50 includes a line buffer 51, and an entropy coder 52. The input color pixel data 100A is input to the line buffer 51 and the entropy coder. The color pixel data 100A, as shown in FIG. 12, in every instance is input as chronological pixel data in a horizontal chronological scan.

The line buffer 51, as a reference pixel generation means, forms reference pixel data an, bn, cn, and dn, relative to the coded object image pixel Xn from the pre-input picture image data 100A. In other words, the line buffer 51 records the continuous record of the n line divisions at the time of scanning. Also, following the inputting of each of the color pixel data 100A of the coded object pixel Xn, the series of pixel data formed from the immediately previous pixel dn, and the peripheral pixels an, bn, and cn are recorded as reference pixel data 110 and output to the entropy coder 52.

The entropy coder 52 is formed for example using the arithmetic coding and (Hoffman) coding methods. Also, the reference pixel data 110 is used as state signals, and the object color pixel data 100A is converted into coded data 200, and output.

The data decoding system 60 is formed to include line buffer 61, and entropy decoder 62. In this instance, the line buffer 61 and the entropy decoder 62 are formed so as to provide a decoded output of the input coded data 200 with entirely the opposite process of the line buffer 51 and the entropy encoder 52 of the data coding system 50.

In this manner, the data coding system 50 and the data decoding system 60 utilize algorithms, which are entirely opposite to each other, to encode the color pixel data 100A into coded data 200, and to decode the coded data 200 into the color pixel data 100B for output. Accordingly, the system can be broadly utilized for each type.

With this type of system, the reference pixel data 110 is utilized by the entropy coder 52, and the entropy decoder 62 state signals. If the number of states, i.e., the number of reference pixels, is great, then the data compression ratio is improved. In other words, when utilization is made of the arithmetic coding method or the Hoffman coding method to realize the entropy coder 52 and the decoder 62, if there is a great bias in the occurrence probability of the 0 and 1 symbols, the data compression ratio can be increased. This is because, with the entropy coding technology, short coding data is (allocated) to the input data having a high occurrence probability, and relatively long coding data is allocated to the input data having low generation probability.

In order to obtain a great bias in the symbol generation (occurrence) probability, according to the prior art, the input data has been classified (grouped) into several states prior to the coding. This is because, without classification (grouping), a good compression ratio cannot be obtained. For example, according to the conventional method shown in FIG. 11, utilization was made of line buffers 51 and 61 to form the reference pixel data. This was input as the state signal used for classification (grouping), into the entropy coder 52 and the entropy decoder 62. Also, the entropy coder 52 and the entropy decoder 62 classify (group) the input data through the utilization of the state signals, thereby accomplishing coding and decoding. In other words, the occurrence probability for each state of the reference pixel data is calculated, and short coding data is given to combinations having high generation (occurrence) probability. By this means, the compression ratio of the data can be increased.

However, with the entropy coder 52 and the entropy decoder 62, it is necessary for the number of coded parameter tables to correspond to the number of states of the reference pixel data. For this reason, to the extent that the number of reference pixels for increasing the compression ratio is great, the coding parameter table is great. Because of this, there is the problem that the entropy coder 52 and the entropy decoder 62 will big, and high in cost.

Assuming that the color pixel data is composed from 4 bit data for each pixel, and that the number of pixels of the reference pixel data 110 is 4, the number of states for coding and decoding parameter tables corresponds to the states of 4 pixels×4 bits=16 bit, namely the number of states becomes 2. For this reason, the parameter table must have 65,536 patterns for $2^{16}$ states. As the number of the reference pixels increases by one, the coding and decoding parameter table becomes extremely large, and it is understood that the hardware composing the entropy coder 52 and the entropy decoder 62 become large in scale. Furthermore, also the object pixel is composed of 4 bits, i.e., 4 planes, and a one-bit signal is applied to each plane. As a result, 16 patterns of color values are obtained with 4 bits. Therefore, the parameter table must have a magnitude of 65536×16 (see FIG. 13).

To overcome this problem, a method has been proposed for calculating the tendency of the occurrence probability of the color symbols of the object pixels, and for allocating short coded data to a symbol which occurs with a high probability, to improve the compression ratio (laid open patent publication 6-276041). This laid open patent publication also discloses a technology for making the parameter table smaller corresponding to the number of degenerated states compressed in the entropy coder 52 and the entropy decoder 62.

The feature of the system for degenerating the number of states as disclosed in laid open patent publication 6-276041 is shown in FIG. 14. The reference pixel data 110 is input as state signals into the entropy coder 52 and the entropy decoder 62 in the same manner as with the prior art data coder system 50 and the data decoder system 60. The feature is, at the time of its input, the state signal 140 is produced by means of the state degenerator 53, and 63 which degenerates the reference pixel data 110 outputted from the line buffers 51 and 61.

The state degenerators 53 and 63 are designed so as to degenerate the input reference pixel data 110 into the state signal 140 which has a relatively small number of bits, and to output it to the corresponding entropy coder 52 and entropy decoder 62. Furthermore, the predictor 54 and 64, are provided to store, in its memory, a color ranking table (the particulars of which are described in the laid open patent publication 6-276041), which is stored in memory in order to convert the color pixel data into the corresponding color rank, based on the probability of occurrence of the color symbol.

Degeneration is an operation for grouping a number of the original states into less numbers of states. Grouping is executed by selecting combinations of states such that the entropy (the average amount of data to display one symbol) of the post-grouping becomes minimum. Identification bits are assigned to the number of the post-grouping states. This becomes the state signal 140.

In the degeneration table utilized in the state degenerators 53 and 63, the relationship between the combination pattern of the color symbol of the reference pixel data 110 and the degeneration data is defined. There is a method, utilizing this degeneration table, for converting the combination pattern of the color symbol of the input reference pixel data 110 into the degeneration data and output.

FIG. 15 shows an example of a degeneration operation which is accomplished based on this method. In this instance, in order to simplify the explanation, an explanation is provided of an example in which Markov model which is formed from the three pixels A, B, and C, is used as a reference pixel pattern relative to the coded object pixel X, as shown in FIG. 15(A).

As shown in FIG. 15(A), when the reference pixels are formed from the three pixels, the combination pattern of the color symbols become five ways as shown in FIG. 15(B). In other words, the patterns are classified into the five patterns, namely, a pattern in which three of the pixel color symbols entirely conform, three patterns in which two of the three color symbols conform, and a patterning which all of the pixel color symbols are different.

Thus, by using the table shown in FIG. 15(B) as the degeneration tables of the state degenerators 53 and 63, $2^{12}$ patterns of the pixel state, which are all the possible combinations of the three pixels, can be reduced to the five states S1–S5 shown in FIG. 15(B). This allows the reference pixel data 110 to be effectively degenerated, and the number of states of the entropy coder 52 can be greatly reduced.

The general method for arithmetic coding and decoding accomplished in this manner is already described in detail in pgs. 26–44 and pgs. 44–50 of *Single Pixel Coding Standard JBIG* (International Standard ISO-IEC11544); however, in this instance, it will be simply explained hereafter as the premise of the present invention.

An example of the arithmetic coding type entropy coder 52 utilized in FIG. 11 is shown in FIG. 16. Since the composition of the arithmetic decoder type entropy decoder 62 is substantially the same as the composition of the coder 52, an explanation of it is omitted.

The entropy coder 52 includes the arithmetic calculator 55, and the RAM 56 which functions as a state storage. Within RAM 56, the state parameter table is written which is necessary for determination of the symbol generation (occurrence) number probability essential to coding. The state parameters are specified by the input state signal. To the table of the parameter specified by the state signal, the arithmetic calculator 55 outputs the data at the time of renewal of the calculator parameters as the readout address. Then, the RAM data specified by the readout address is output to the arithmetic calculator 55. The arithmetic calculator 55 converts the input color rank data 120 into coded data 200, on the basis of such input data, and output it.

With such prior art technology, the compression ratio becomes relatively high. However, since the bias of the occurrence probability of the data is not sufficiently taken into account, the compression ratio is fairly low in comparison with the theoretical compression ratio. In addition, since there is substantial degeneration as well, the parameter table also becomes small, and the entropy coder 52 and the entropy decoder 62 are also made smaller. However, only the reference pixels are taken into consideration, and grouping is not conducted to the states of the object pixel for prediction. Because of this, in terms of decoding, time taken for defining the object pixels, i.e., time taken for determining the final value for each plane to which each of the bits of the object pixels is allocated, is not used in the prediction operation, which makes the decoding rate poor.

Additionally, at the time of accomplishing compression or expansion (de-compression), the calculated time according to the RAM or ROM is extended, in addition to the delay in the interconnects, and decoding may not occur on time relative to the input of the data. Because of this, high cost, high speed ROM or RAM becomes necessary, and the entropy decoder 62 also remains in its existent state, in large scale and high cost form.

SUMMARY OF THE INVENTION

The present invention was conceived to overcome the problems, and aims to provide a data coding device and method and data decoding device and method which overcomes the above problems, wherein the data compression ratio is increased even more, and in which the hardware is miniaturized.

In addition, the present invention has as its objective the providing a data decoding device and method wherein the data decoding rate is increased, and wherein the hardware is miniaturized and kept low in cost.

In order to achieve these objectives, a data coding device is provided wherein the input object color pixel data is coded into coded data, and output, the object color pixel data being a single parallel data consisting plural bits. The data coding device includes a parallel/serial conversion means for successively generating each of the plural color bits in series to form a serial data string; a state signal generating means which generates a state signal every time each bit of the serial data string is output from the conversion means; a prediction means which utilizes the state signal to group the subsequently input bits based on the probability and an arithmetic calculator which utilizes the data from the prediction means, to convert the color pixel data into coded data, and outputs it.

In this structure, the compression ratio for encoding the object pixel can be made higher than with the conventional art because the bias in the probability of the occurrence of each bit (plane) of the object pixel to be encoded is considered. As a result, the hardware can be miniaturized, and at the same time, data transmission time can be compressed.

In another aspect of the invention, a data decoding device is provided, in which the input object coded data is decoded into color pixel data composed from multiple bits, and output it. The decoding device comprises a serial/parallel conversion means for receiving the serial data composed from each bit and for converting the serial data into a single parallel data consisting of the multiple bits; a state signal generation means for generating a state signal every time each bit is input to the serial/parallel conversion means; a prediction means which utilizes the state signal to group the subsequently input bit based on the probability; and an arithmetic calculator which utilizes the data from the prediction means to convert the object coded data into color pixel data, and outputs it.

Through the utilization of the bias in the occurrence probability of each bit of the input objectcoded data, the expansion efficiency at the time of decoding the object pixels can be increased to a level higher than that of the prior art. As a result, in addition to enabling the miniaturization of the hardware, at the same time the replication speed of the pixel of the picture image data can be increased.

In still another aspect of the invention, a data coding method is provided, wherein the input object color pixel data is coded into coded data and output, the object color pixel data being a single parallel data consisting of multiple bits. The method comprises the steps of inputting the parallel data into a parallel/serial conversion means to convert to serial data; outputting the state signals for every input of the bit; utilizing the state signals to group the subsequently input bit based on the probability; and using the data obtained from the grouping step to convert the object color pixel data into coded data, and output using an entropy coding technique.

In this method, it is possible to increase the compression level to a level greater than that of the prior art at the time of coding the object pixels, because utilization can be made of the bias of the occurrence probability of each bit of the coded object pixels. As a result, hardware which uses this method can be miniaturized, at the same time as which by means of this method the compressed data can be transmitted to another device in a shorter period of time.

In still another aspect of the invention, with a data decoding method is provided wherein the input object coded data is decoded into color pixel data composed from multiple bits, and output. The method comprises the steps inputting each of the bits serially into the serial/parallel conversion means for converting it into parallel data; outputting the state signal for every input of the bit, predicting and grouping the subsequently input bit based on the probability, using the state signal converting the object coded data into color pixel data and outputs it based on the data obtained in the prediction and grouping step, using an entropy decoding technique.

Utilization can be made of the bias of the occurrence probability of each bit of the input object coded data, and the expansion efficiency can be improved to a level greater than that of the prior art at the time of decoding the object pixels. As a result, the replication speed of the pixel data can be increased, at the same time as which hardware utilizing this method can be miniaturized.

In addition, a data decoding device is provided wherein the input object coded data is decoded into color pixel data and output by means of the entropy decoding means. The entropy decoding means comprises (1) an arithmetic calculator for receiving the object coded data and for decoding the signal having a value, "1" or "0"; (2) a RAM that receives the signal from the arithmetic calculator and, regarding the state signal determined on the basis of the signal from arithmetic calculator, outputs a calculation instruction for both cases of the signal value "1" and "0"; ROM address calculation for executing the multiple ROM address calculations in parallel in response to the instructions from the RAM; and a ROM hat is accessed based on the calculation results from the ROM address calculator and that outputs a result determined by the next decoded signal to the arithmetic calculator when the next signal is specified.

Furthermore, the invention provides a data decoding method wherein the input object coded data is decoded into color pixel data by means of the entropy decoding process and output. The entropy decoding process comprises the steps of generating the state signal which is determined by the decoded signal output from the arithmetic calculator and having a value "1", or "0"; accessing the RAM address on the basis of the state signals and instructing ROM address calculation for the subsequently decoded signal for both cases of the values "1" and "0" respectively, accessing to the ROM on the basis of the address calculation results; and inputting the ROM access result determined by the next decoded signal to the arithmetic calculator when the next decoded signal is specified and utilizing the ROM access results for decoding of the subsequently input object coded data following the next decoded signal, thereby decoding data.

In this manner, the ROM has prepared plural prediction results prior to the confirmation of the bits, by means of parallel processing. Once the bits have been confirmed, the arithmetic calculator can then immediately obtain the results from the ROM. As a result, parallel processing becomes possible, and the decoding rate of the data is improved. Because of this, along with an improvement in the quality of the decoded picture image data, there is no need for high cost high speed ROM or RAM, and instruction can be made of hardware utilizing ordinary RAM or ROM.

In addition, the invention provides a data decoding device wherein the input object coded data is decoded in color pixel data composed from multiple bits, and output. The data decoding device comprises (1) a serial/parallel conversion means which converts a plurality of bits of the serial data storing into a single parallel data consisting of multiple bits; (2) a first state signal generation means for generating a first state signal every time following the bit of the serial data string is input into the serial/parallel conversion means; (3) a second state signal generation means that receives reference pixel information of the peripheral pixels, including at least the previous pixel data of the pixel data to be decoded in the parallel data, and groups the states of the reference pixels to generate the second state signal; (4) and a degeneration state table generator for forming a degeneration table in which second state signals, which corresponds to the first state signals having a low occurrence probability, are abbreviated into a single state, based on the combination of the first and second state signals.

The pixel data which is to be decoded is composed of multiple bits, and since it is expanded utilizing the respective bit data and the reference pixel data surrounding it, the expansion rate can be sped up. Furthermore, since utilization is made of the degeneration state table, the parameter table becomes smaller, and the data decoding device is miniaturized and becomes low in cost.

The data decoding device may further comprise an arithmetic calculator that receives the object coded data and decodes the signal having a value "1" or "0"; a RAM which has the table generated by the degeneration state table as a state signal address, receives a signal from the arithmetic calculator, and outputs a calculation instruction for the next decoding signal for both cases of the values "1" and "0", on the basis of the address of the table determined by the signal from the arithmetic calculator; and a ROM address calculator which accomplishes calculations of multiple ROM addresses in response to the calculation instruction from the RAM; and a ROM which is accessed by means of the ROM address calculator and, among the access results, outputs an access result corresponding to the confirmed value of the next decoding signals to the arithmetic calculator.

In this manner, the expansion ratio is improved by utilizing the degenerated state table and preparing the results in advance by means of ROM, thereby improving the processing speed without enlarging the RAM.

In the degeneration state table, second state signals, which correspond to the first state signal necessary for decoding the initial bits of each color pixel data, are abbreviated into one state.

Even if the second state signal of the immediately previous reference pixel is not confirmed, the state can be specified to a prescribed state corresponding to the first state signal. Even when the immediately prior reference pixel is not restored, the ROM calculation becomes possible in advance, and parallel processing can be achieved in the broad range. Because of this, the processing speed is increased, and at the same time there is no need for the use of high cost high speed ROM or RAM, thereby providing a low cost data decoding device.

BRIEF DESCRIPTION OF THE DRAWINGS

FIG. 5 is a table which explains the first state signal utilized in the present invention;

FIG. 6 is a diagram which explains the reference pixels in order to generate the second state signalling device in the present invention;

FIG. 7 is a diagram which explains the second state signal utilized in the present invention;

FIG. 8 is drawing which explains the degeneration of the first state signal utilized in the degeneration state table of the present invention;

FIG. 9 is a diagram which explains the first state signal utilized in the degeneration table of the present invention;

FIG. 10 is a diagram which shows the degeneration state utilized in the present invention;

FIG. 13 is a diagram which shows a parameter table according to the prior art;

FIGS. 15(A) and 15(B) are a diagram which shows an example of a degeneration table according to the prior art.

DETAILED DESCRIPTION OF PREFERRED EMBODIMENTS

Figure 1:
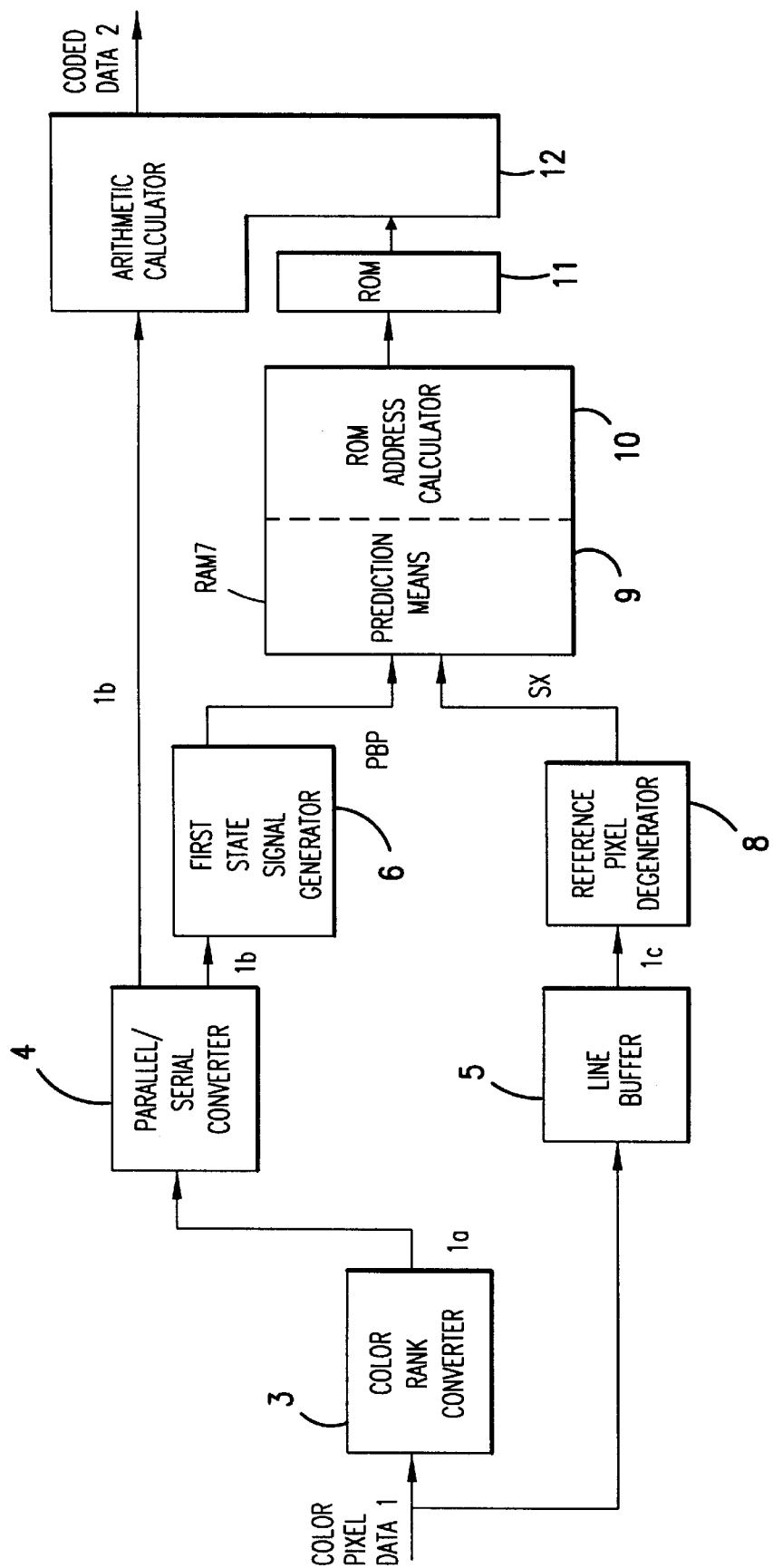
FIG. 1 shows a block drawing of the shape of an embodiment of a data coding device according to the present invention.

FIG. 1 shows a data coding device which compresses and converts color pixel data 1 into coded data 2. The data coding device includes a color rank converter 3 which receives the color pixel data 1 and rearranges the color rank based on the probability of occurrence of the color. Small numbers are given to those colors which occur with a high probability and larger numbers are given to those colors which occur with a low probability for the rearrangement of the color rank. The data coding device further includes a parallel/serial converter 4 which receives the converted color pixel code data 1a, and converts it to serial data; a line buffer 5 which receives the color pixel data 1; a first state signal generator 6 which generates a first state signal PBP every time the bit signal which has been converted into serial data 1b through the parallel/serial converter 4 is input; and a RAM 7 into which the first state signal PBP is input. RAM 7 is composed of a prediction means 9 and a ROM address calculator 10. The data coding device further includes a reference pixel degenerator 8 which serves as a second state signal generator and receives the reference pixel data 1c from the line buffer 5; a ROM 11 which is accessed based on the processing results of the prediction means 9 and the ROM address calculator 10 within the RAM 7; and an arithmetic calculator 12 which receives the rearranged color pixel code data 1a and converts the color pixel code data 1a into coded data, utilizing the access results of the ROM 11.

Figure 2:
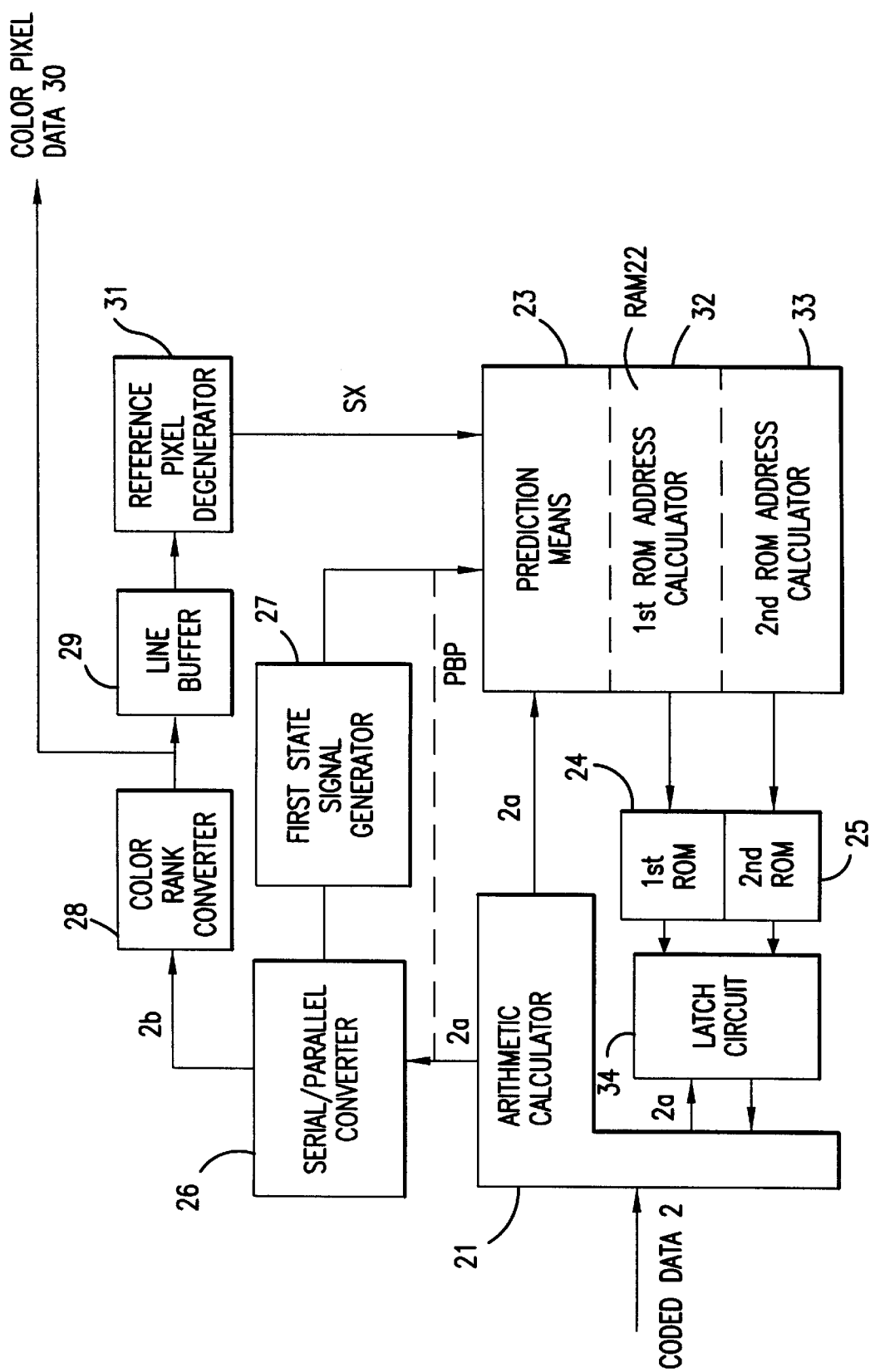
FIG. 2 shows a block drawing of the shape of an embodiment of a data decoding device according to the present invention.

FIG. 2 shows a data decoder which restores the coded data 2 to the color pixel data 30. This data decoder expands the data using a method slightly different from ten data compression algorithm used for the data coding device shown in FIG. 1. However, the data decoder may be designed to operate exactly the opposite algorithm of the algorithm used in the device shown in FIG. 1.

The data decoder includes an arithmetic calculator 21 which receives the coded data 2; and a RAM 22 which receives the decoded signal 2a having a value "0" or "1" from the arithmetic calculator 21. RAM 22 includes a prediction means 23, first ROM address calculator 32 and second ROM address calculator 33. The data decoder further includes ROM 24 and 25, which are accessed on the basis of the processing results of the prediction means 23 and the first and second ROM address calculators 32, 33 within the RAM 22 and outputs the access result to the arithmetic calculator 21 thorough the latch circuit 34. The latch circuit 34 receives and holds the access results from the first and second ROMs 24 and 25 upon input of the decoded signal 2a, and supplies one of the access results to the arithmetic calculator 21 depending on the value of the decoded signal 2a. The data decoder further includes a serial/parallel converter 26 which converts the decoded signal 2a into parallel data 2b; a first state signal generator 27 which generates a first state signal PBP every time the decoded signal 2a is input in serial into the serial/parallel converter 26; a color rank converter 28 which converts the parallel data 2b through the same algorithm as that used in the color rank converter 3 to decode the color pixel data 30; a line buffer 29 which receives the color pixel data 30 and generates reference pixel data; and a reference pixel degenerator 31 which receives the reference pixel data from the line buffer 29, and serves as a second state signal generator for generating the second state signal SX.

Figure 3A:
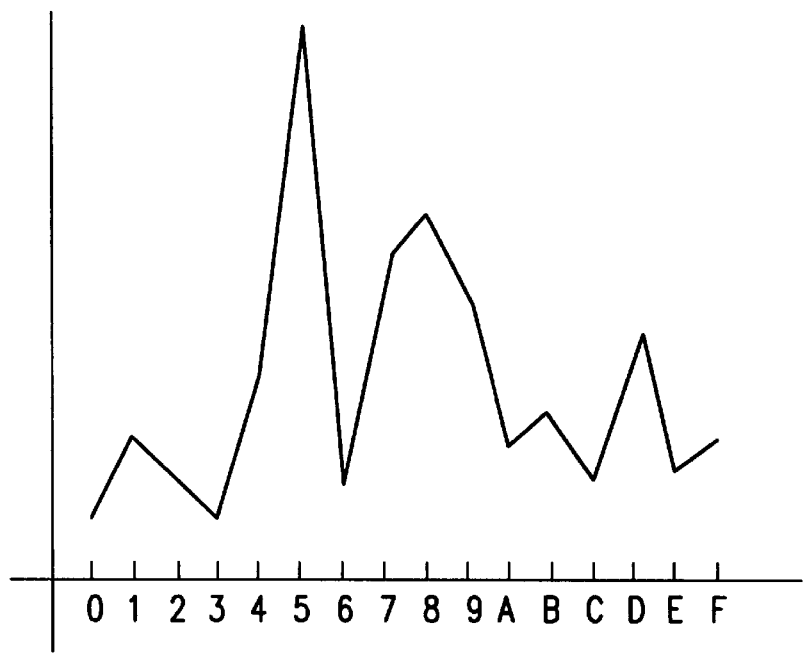
FIG. 3 is a diagram which explains the color rank conversion used in the present invention, wherein (A) shows the state prior to the color rank conversion, and (B) shows the state following the color rank conversion, respectively.
Figure 3B:
Figure 3B:
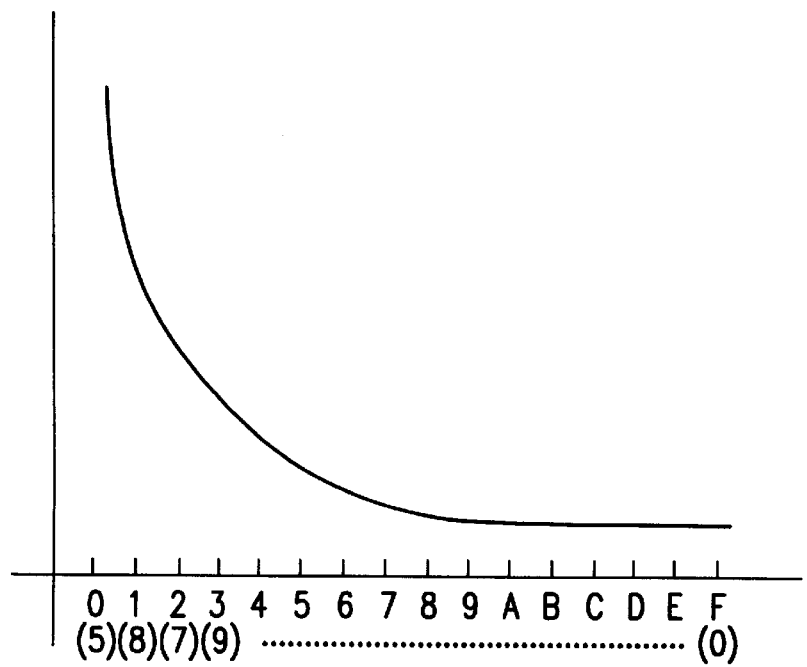

An explanation is provided hereafter with respect to the operations of the data coding device and the data decoding device. First of all, an explanation will be provided with respect to the compression of the color pixel data 1 into the coded data 2, with reference to FIG. 1. In this instance, the color pixel data 1 is constructed by 1 pixel of 4 bits. Regarding the input color pixel data 1, as shown in FIG. 3(A), sixteen (16) colors (0 through F) are input with random probabilities. The color rank of the color pixel data 1 which has been input with a random probability is converted by the color rank converter 3. The color rank conversion, as shown in FIG. 3(B), is an operation to rearrange the color order such that smaller numbers are applied to those colors which occur often with a small amount of data, and larger numbers are applied to those color which do not occur very often, with a large amount of data. The standard for rearrangement of the color order is not fixed, but is flexible through the learning of the occurrence probability of each color of the color pixel data 1. Thus, the color rank conversion is one type of data compression. There are various methods of learning; however, in the preferred embodiment, the most recently generated color is given the uppermost rank (=0), and other colors are subsequently shifted to one rank lower.

The color pixel code data 1a whose color order has been converted is input into the parallel/serial converter 4.

Figure 4:
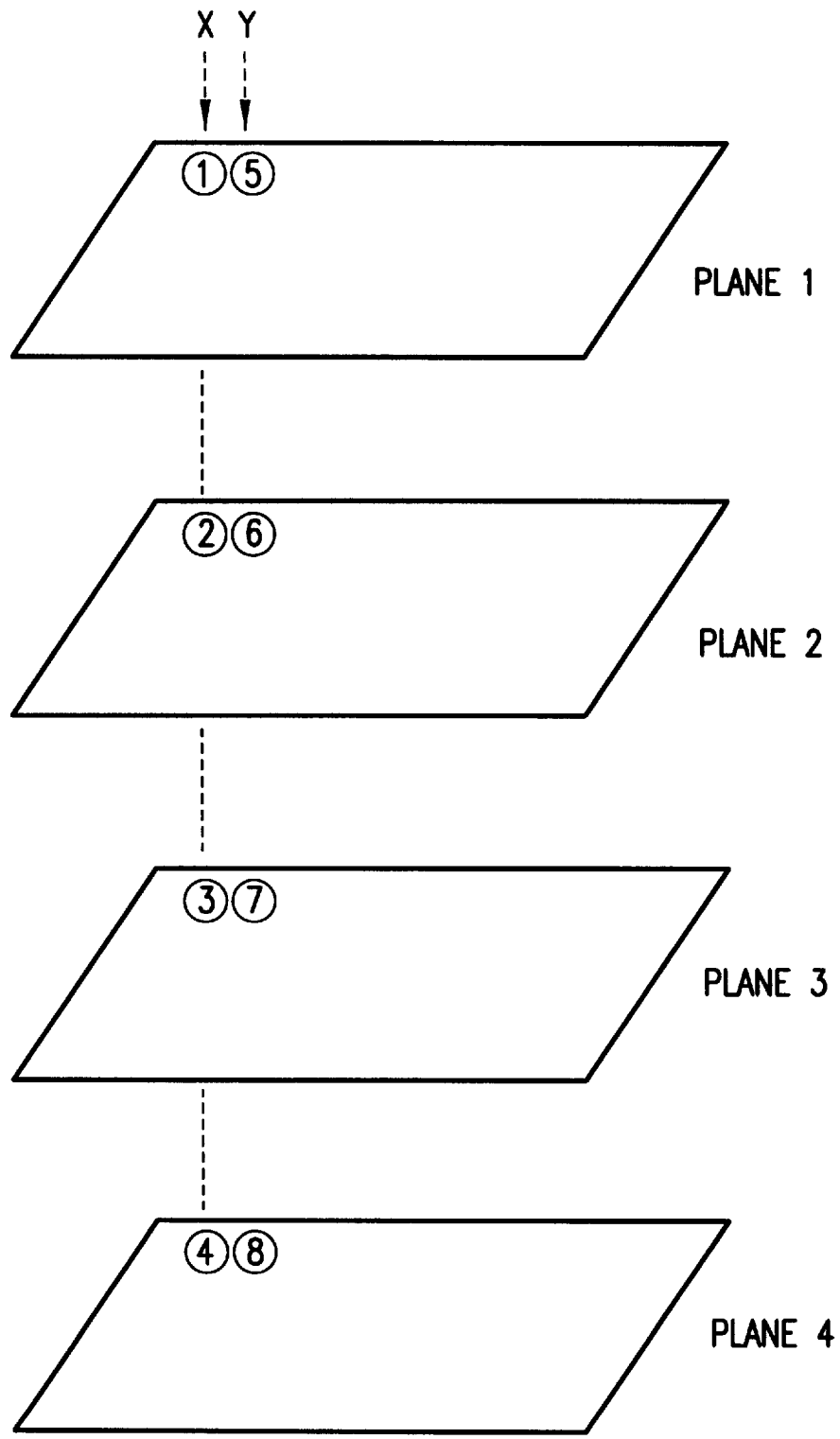
FIG. 4 is a drawing which explains the method of apportionment of the pixels utilized in accordance with the present invention.

The parallel/serial converter 4 converts the color pixel code data 1a, which is 4 bit parallel data, into the 1 bit unit serial data 1b, which is necessary for the calculations described below. The conversion of the parallel data 1a into the serial data 1b means the apportionment of the 4 bit data into 4 planes. In other words, if for example the 4 bit color pixel data X has a value "0011", then as shown in FIG. 4, "0" is apportioned to the area (1) of plane 1, "0" is allocated to the area (2) of plane 2, "1" is assigned to the area (3) of plane 3, and "1" is allocated to the area (4) of plane 4. Similarly, with respect to the subsequent 4-bit color pixel data Y, "0" or "1" is successively apportioned to areas (5)–(8). Thus, the apportionment operation is accomplished by means of the parallel/serial converter 4.

However, if this operation is simply accomplished, then the data cannot be compressed. In the preferred embodiment, the first state signal PBP is generated by first state signal generator 6 every time the bit of the serial data is output. More particularly, as shown in FIG. 5, if the value of the plane 4 of the previous color pixel data 1 is determined, then the first state signal becomes [14]. This state means that the 4 bits of the object color pixel data 1 to be compressed are all unfixed, and in the "0" state (=0 STATE). Subsequently, if the signal of plane 1 is confirmed, and if the value is "0", then the PBP output becomes [6], and if the value is "1", then the PBP output becomes [13]. Thus, the first state signal PBP is output on the basis of FIG. 5, following the determination of each plane signal.

The PBP signal is input to the prediction means 9 of RAM 7, and utilized in grouping and determining the signal value for the next plane. For example, when fixing the signal for the PLANE 2, the PBP corresponding to the fixed signal of plane 1, i.e., "6" or "13" is input to the prediction means 9 as shown in FIG. 5. Determination of the next signal is accomplished based on the grouping corresponding to [6] or [13]. This increases the compression ratio when converting the next signal of plane 2 to the coded data 2. In the same manner, when fixing the signal for plane 3, PBP "2", "5", "9" or "12" is input to the prediction means 9, which corresponds to the state "00" "01" "10", or "11", defined by plane 1 and plane 2. When the value defined by plane 1 and plane 2 is "10", then the corresponding PBP becomes [9]. This PBP is input into the prediction means 9, and utilized to convert the next bit signal for plane 3 to coded data.

Figure 11A:
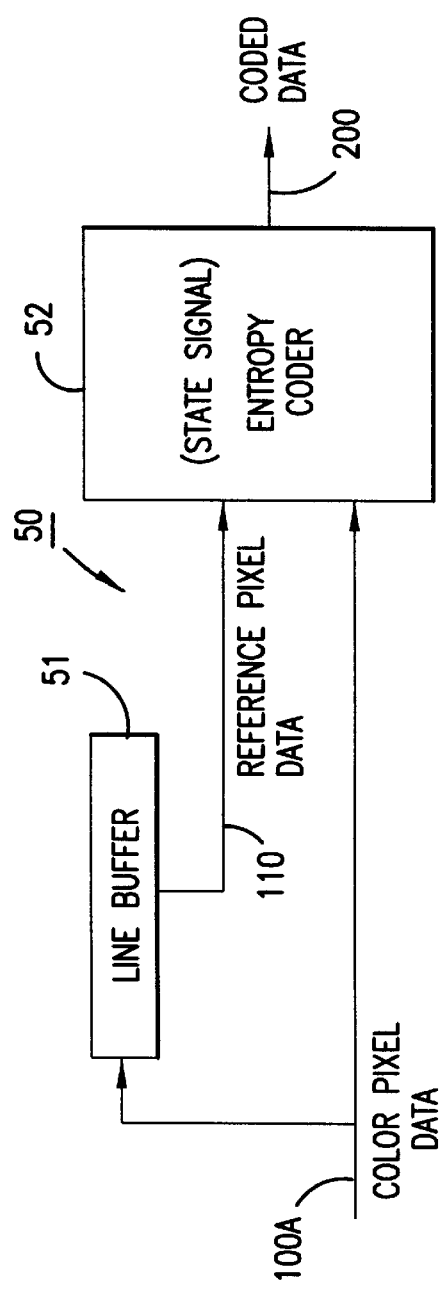
FIG. 11 is a block diagram of a data coding system and data decoding system according to the prior art.
Figure 11B:
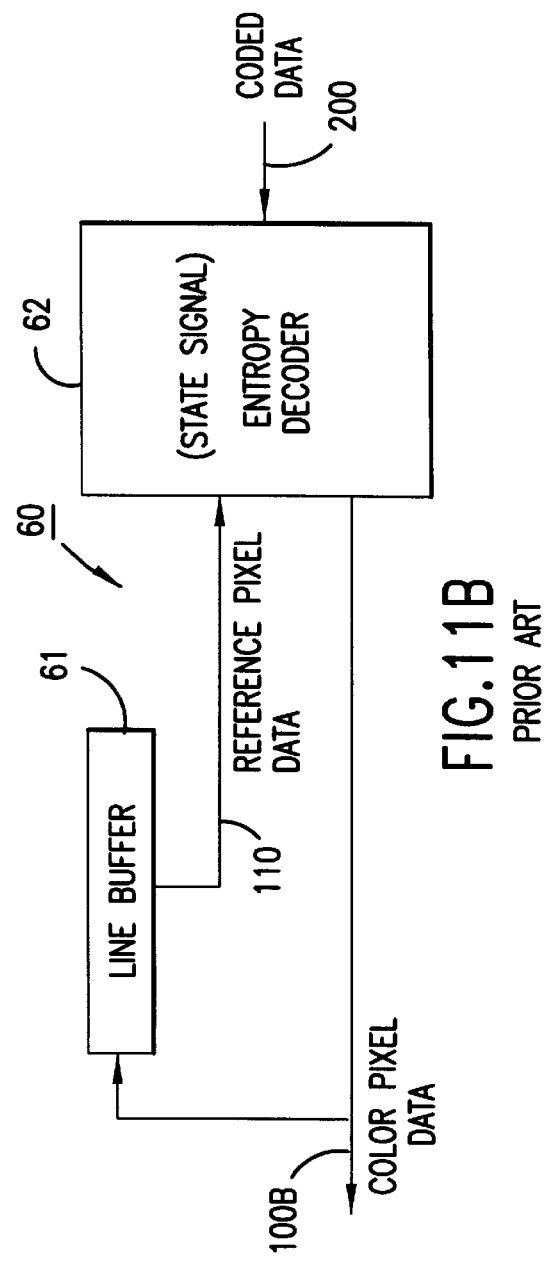
Figure 12:
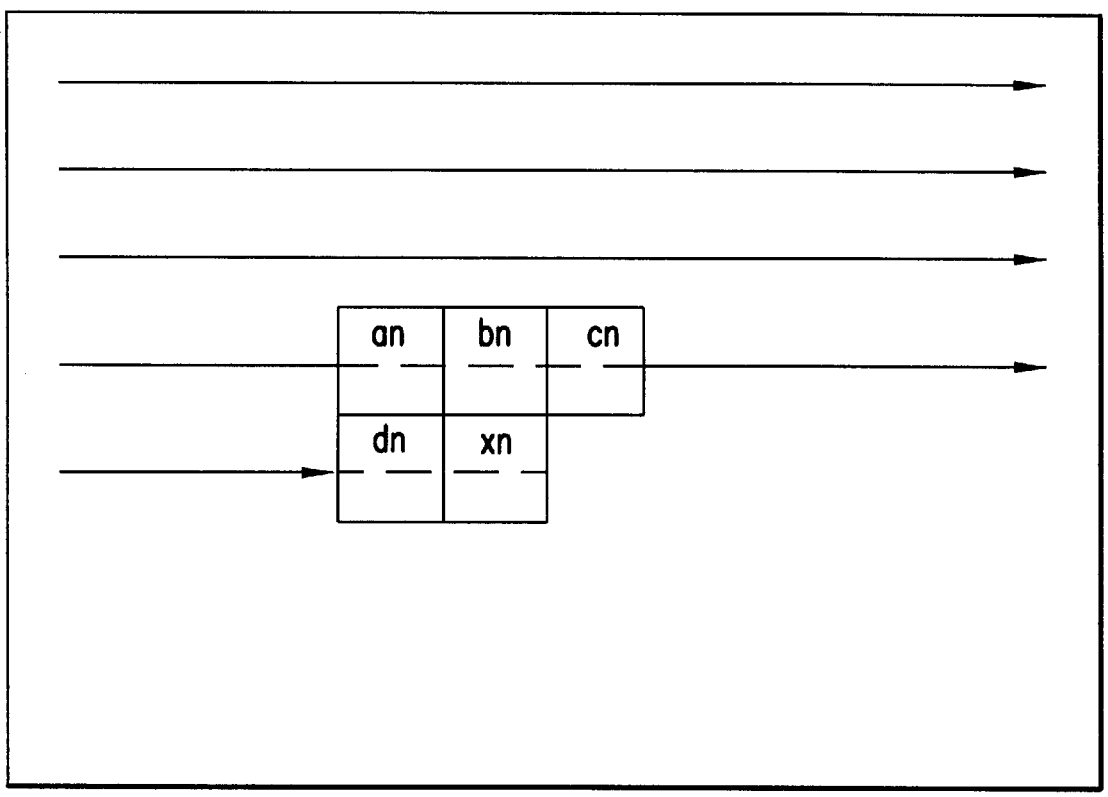
FIG. 12 is an explanatory diagram of the reference pixel data relating to the coding object pixel data of the prior art.
Figure 14A:
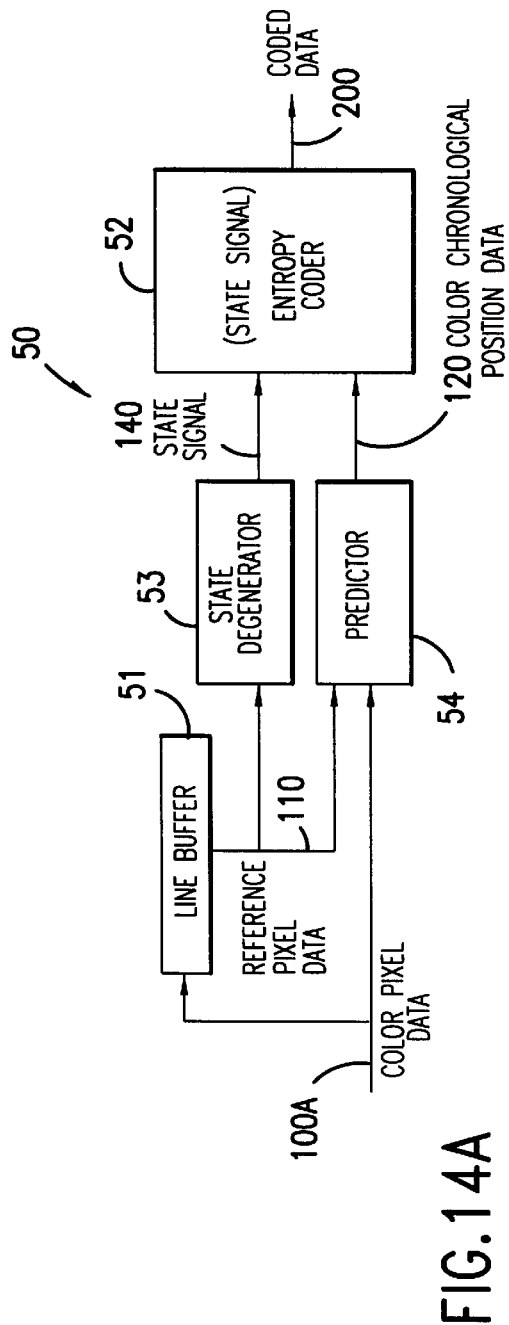
FIG. 14 is a block diagram of a data coding system and a data decoding system according to the prior art, which is part of a state degenerator.
Figure 14B:
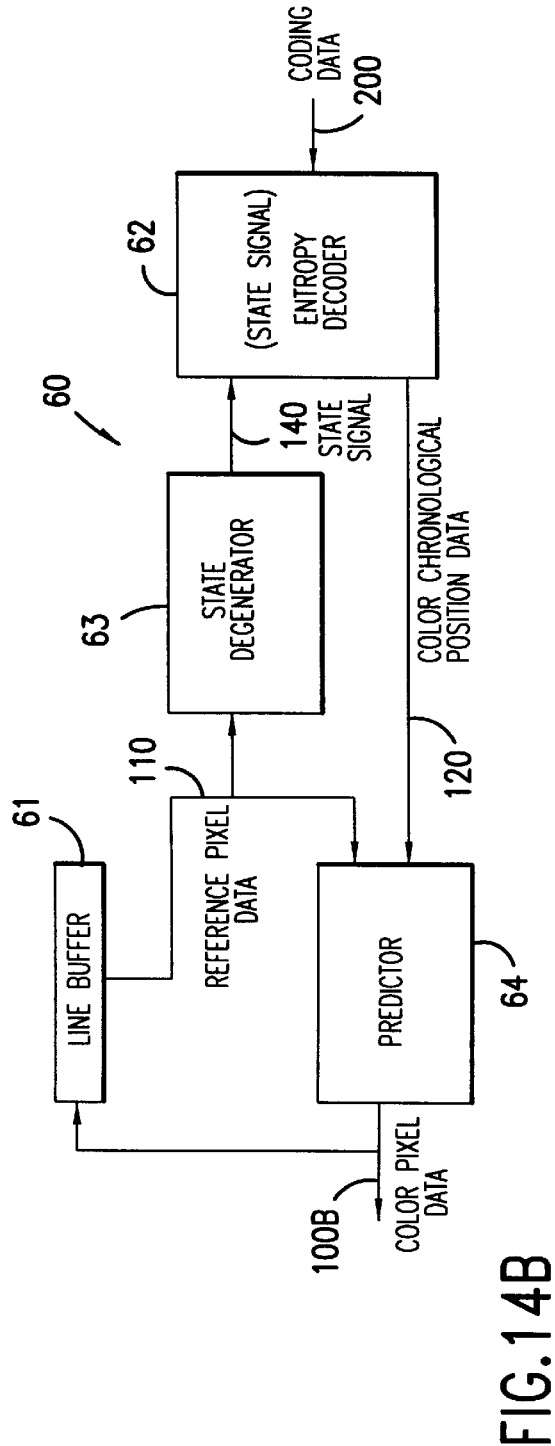
Figure 16:
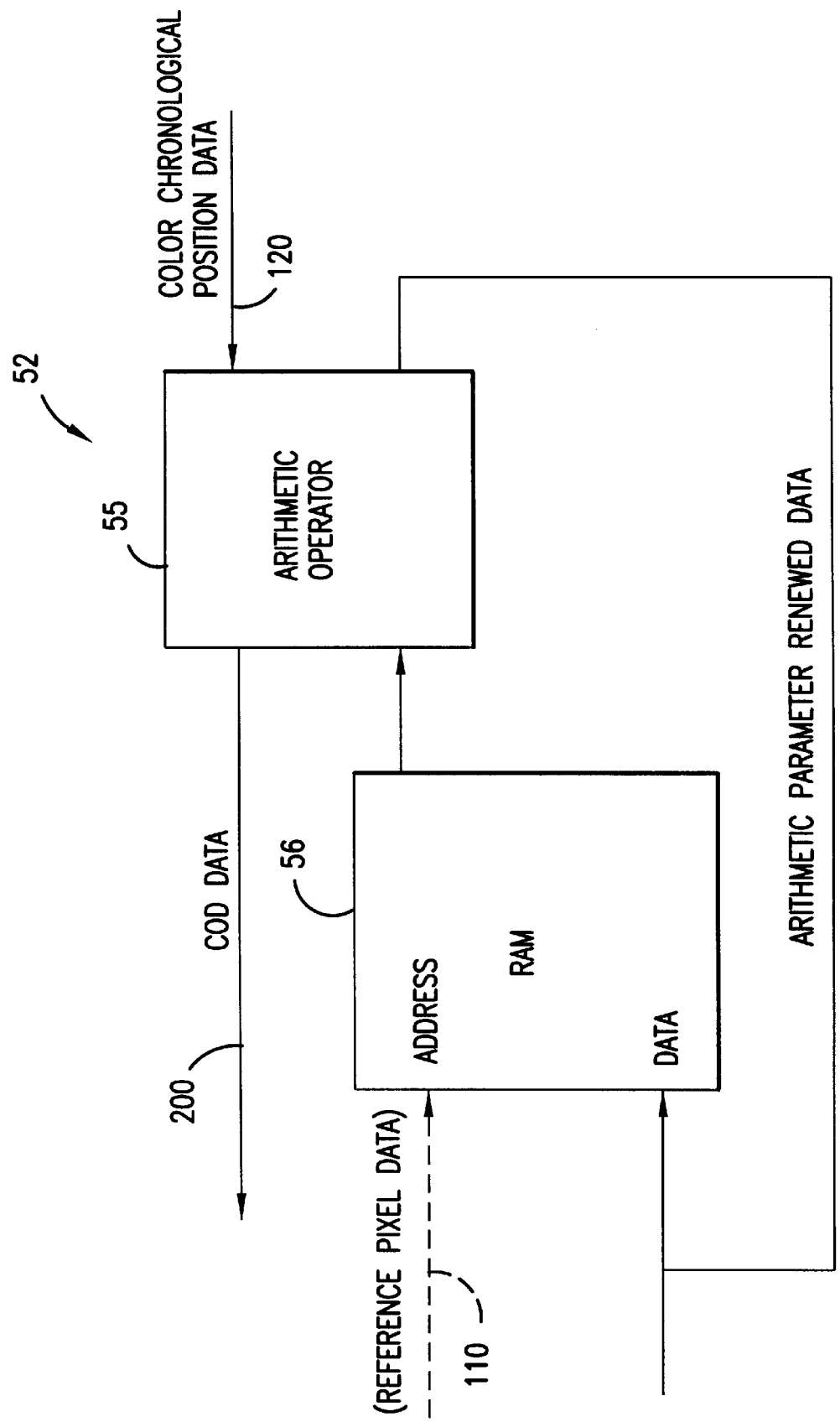
FIG. 16 is an explanatory diagram of an entropy coder and entropy decoder of an arithmetic coding type according to the prior art.

The line buffer 5 has the same function as the line buffer 51 shown in FIG. 11, and serves as the reference pixel generation means. The color pixel data 1 is input to the line buffer 5 to create, for example, a known Markov model shown in FIG. 12, which is then output as the reference pixel data 1c. In this embodiment, as shown in FIG. 6, the peripheral 3 pixels are used as the reference pixels.

The reference pixel data 1c of the three reference pixels is input into the reference pixel degenerator 8 which functions as the second state signal generator, and is output as the second state signal SX. This reference pixel degenerator 8 degenerates the reference pixel state comprising $2^{12}$ (=$2^4 \times 2^4 \times 2^4$) ways into 5 states (SX0–SX4) as shown in FIG. 7. The signal SX is input into the prediction means 9 of RAM 7, and, in cooperation with the first state signals PBPs, creates a state table which is grouped into 75 states (15×5). This state table is created within the prediction means 9 of RAM 7, and corresponds to the address of RAM 7.

In the memory of RAM 7, the address of ROM 11 corresponding to the RAM address, and the parameters necessary for the compression of the data by the arithmetic calculator 12 are written. When the first state signal PBP and the second state signal SX are input into the prediction means 9, that is, when the address of the RAM 7 is designated, the ROM address calculator 10 reads out the corresponding ROM address and parameter from the memory. On the basis of the operational results, access is made to ROM 11. The ROM 11 outputs the data which is internally accumulated to the arithmetic calculator 12 on the basis of its address. The ROM 11 ordinarily has several hundred addresses; however, in the preferred embodiment, a simple ROM having approximately 50 addresses is used. Of course, utilization may also be made of prior art items. In addition, the address of the ROM 11, which is stored in the memory within each address of the RAM 7, is updated based on learning with due reflection to the most recent ROM address results. In other words, when the same address of RAM 7 is designated later, the corresponding address of the ROM 11 has been changed to another number. By this means, even greater bias in data can be obtained, and the compression ratio can be increased. Furthermore, if the same bit ("0", or "1") continues, then from some point in time, access will be made to the same address.

The arithmetic calculator 12 has the same structure as the known arithmetic calculator utilized with the (Hoffman) type or arithmetic code type encoder known under the conventional art. In other words, serial data 1b which is input from the parallel/serial converter 4 is converted and output as the coded data 2, on the basis of the address data from ROM 11 and the compression parameter maintained within RAM 7. In creating this coded data, utilization is made of data within ROM 11 on the basis of the state table shown previously. Because the bit of the current state is associated with the bits of the same previous state, using that applied relationship, an improvement in the compression ratio can be obtained.

Expansion of the coded data 2 is accomplished by the data decoding device shown in FIG. 2. Coded data 2 is initially input to the arithmetic calculator 21. Here, it is converted into the decoded signal 2a of "0", or "1", and input into the prediction means 23 of RAM 22. In the conventional technique, the address of the state table (described above), i.e., the address of the RAM 22 is determined by confirming the signal, and calculation is accomplished of the ROM address on the basis of its determination. Subsequently, the ROM is accessed, and on the basis of its output, the signal of "0" or "1" signal is decoded relative to the next coded data 2 by means of the arithmetic calculator 21, accomplishing an operation for once again inputting it into RAM 22.

Even with this type of operation, if utilization is made of high cost high capacity RAM or ROM, then it can adequately withstand use. However, in order to accomplish even greater high speed processing according to the preferred embodiment shown in FIG. 2, two ROMs, the first ROM 24 and the second ROM 25, are used for parallel processing as well as concurrent processing, thereby increasing the processing rate. In addition, in order to accomplish the parallel processing and the concurrent processing, the state table formed from the first state signal PBP and the second signal SX used data coding is degenerated, as shown in FIGS. 8–10, and utilized.

In the data decoding device, prior to inputting the coded data 2, two processing results were prepared by the two ROMs 24 and 25 in advance, for two cases in which the converted coded data 2a has a value "0", and has a value "1". When the value of the converted data 2a is fixed by the arithmetic calculator 21, one of the processing results corresponding to the "0" or "1" is obtained from one of the ROM 24 and 25, and is input into the arithmetic calculator 21 for the processing of the next coded data 2. This processing may seem to be the same as the ordinary processing shown previously. However, with ordinary processing, too much time is required, beginning from RAM 22, until the point that re-inputting is accomplished into RAM 22, and the processing cannot catch up with the inputting of the coded data 2. However, with the concurrent processing, according to the invention, the precalculated results, is simply read out, and the processing time can be greatly reduced even with a conventional slow decoder, achieving, adequately withstanding use.

Next, a detailed explanation will be provided with respect to the concurrent processing.

Prior to receiving the coded data 2 to be decoded, the decoded signal 2a, which has been converted immediately before by the arithmetic calculator 21, isinput to the serial/parallel converter 26. The serial/parallel converter 26 is connected to the first state signal generator means 27 which generates the first state signal every time the decoded signal 2a (serial data) is input. The generated first state signal PBP is input into the prediction means 23 of the RAM 22. As shown by the broken line, the decoding signal 2a from the arithmetic calculator 21 may be input directly into the first state signal means 27.

In this instance, the first state signal PBP is degenerated in the manner shown in FIGS. 8 and 9, compared with the first state signal PBP used for data encoding based on the table shown in FIG. 5. This is coupled with the degeneration of the second signal SX described hereafter, and makes up the degeneration state table shown in FIG. 10. More particularly, the state signal PBP of the [0] state (=0 STATE) is set to [14] in the same manner as with FIG. 5, and the new PBP is set to [7]. In the state [1] (=1 STATE) the PBP with respect to the value "0" changes from [6] to [10], and the new PBP becomes [5], and the PBP relative to "1", changes from [13] to [11], and the new PBP becomes [5]. In organizing the table shown in FIG. 8, a table is formed such as shown in FIG. 9. In this manner, the first state signal PBP is degenerated into 8 types. In other words, in this instance, relative to one state signal, two current decoded signals are apportioned for the instances of "0", and "1", to allow the access to the two ROM 24 and 25 with a single signal, thereby reducing the capacity of the memory, while increasing the access speed. Also, on the basis of the table shown in FIG. 9, the parallel processing can be accomplished in the manner described hereafter.

On the other hand, the parallel data 2b which has been converted by the serial/parallel converter 26 is input into the color rank converter 28 which is provided with the same function as the color rank converter 3 shown earlier, and output as color pixel data 30, while being input to the line buffer 29. The line buffer 29 has the same function as the line buffer 5 of FIG. 1, and the line buffer 51 of FIG. 11, and functions as a creation means for the reference pixels shown in FIG. 6.

The reference pixels obtained from the line buffer 29 is degenerated into the five states, by means of the reference pixel degenerator 31, on the basis of the principles shown in FIG. 7. The reference pixel degenerator 31 functions as a second state signal generator, and inputs the second state signal SX into the prediction means 23 of the RAM 22.

Within the prediction means 23 is created the degeneration state table shown in FIG. 10, which forms the addresses of RAM 22. The degenerator state table is divided into 31 states, compared with the state table in the data coding shown previously, which is grouped into 75 ways of state (5×15). This means degeneration is accomplished in the amount of over 50%. In the address calculation of RAM 22, CX shown in the table is led out by using the calculation formula of [PBP×2+0], and [PBP×2+1]. On the basis of the classification, the first ROM 24 is responsible for the former address, and the second ROM 25 is responsible for the latter address.

The characteristics of the degeneration state table lie in the fact that, only when portions having a high degree of importance is contained, i.e., only when the CX calculated from the first state signal PBP is from 0–3, the second state signal SX is grouped into the ordinary five states. Another feature is that when the second state signal SX is not divided where the first state signal PBP of value [7], i.e., where each plane value is entirely unfixed is applied. Grouping the SX into 5 states is not limited to the range of CX 0–3, but also of adopting (examples) of other range such as CX 0–7. However, in general, as shown in FIG. 3(B), the occurrence probabilities of the upper four colors of the color rank occupy most of the portions, the instances in which the composition of the plane 1 and plane 2 are "00" become great. In other words, CX=0 through CX=2 are dominant. Because, in the preferred embodiment, parallel processing is executed, the case of CX [3], is associated with the case of CX [2], both of which are made to correspond the signal of "**01". Also, the PBP relating to this signal takes the value [1], which is the same PBP value as that of the CX [2]. In the table of FIG. 10, the first state signal, which is generated when the signal of the plane 4 of the previous pixel is in the process of decoding, is set to the value [7] of the lowermost column, however, as long as the second state signal SX is not grouped, then it may be set to another location of the table.

Thus, a method is adopted, wherein the components having a high degree of importance necessity, i.e., components in which the compression ratio can be made high, are grouped based on the occurrence probability, and components having a low degree of importance necessity, i.e., components which there is no influence on the compression ratio are not grouped. This allows the address of RAM 22 to be made smaller, while maintaining high compression ratio, and the memory size can be reduced. Since the number of gates also is reduced, the RAM 22 can be miniaturized, and its operational speed can be improved.

In addition, the processing results utilized when the first state signal PBP is [7], i.e., when the bit signal of the plane 1 is decoded, are prepared in at least one of the ROM 24 and ROM 25. In other words, in order to accomplish concurrent processing, prior to the input of the data to be decoded into the arithmetic calculator 21, it is necessary to obtain the processing results the decoded data of values "0", and "1" in advance. However, when the data of plane 1 is decoded, then since currently the one previous reference pixel itself of the pixels to be decoded is in the process of being decoded, then the second state signal SX and the first state signal PBP are not obtained. Therefore, with the state table designed so as to have 75 states, the address is not determined, and the process results utilized in the data conversion for the plane 1 cannot be prepared in advance. However, with the degeneration state table shown in FIG. 10, even if the one previous reference pixel is in the process of being decoded, by the prior calculation for PLANE 1, the first state signal is set to [7], the CX is set to [E], and notwithstanding what the second state signal SX is, the address of the RAM 22 takes a single value of "1E". Because of this, the preprocessing of plane 1 utilizes the address of the "1E" within the prediction means 23, and this processing can be accomplished by both the first ROM 24 and the second ROM 25.

Practically speaking, if the address [1E] is determined, then even if the signal of the plane 4 of the one prior reference pixel is in the process of being decoded (showing the 0 STATE in FIG. 9, with the values of planes 1–3 of the one prior reference pixel fixed, and with the plane 4 unfixed), then the first ROM 24 and the second ROM 25 can prepare the processing results corresponding to the [1E]. In other words, based on the address "1E" determined by the degeneration state table within the prediction means 23, the first ROM address calculation component 32 can access the first ROM 24, and prepare the processing results. Furthermore, this accessing is accomplished in the same manner as with the data coding device described previously. In other words, the RAM 22 preserves the address of the first ROM 24 corresponding to the address [1E] and the parameters used for expansion of the data by the arithmetic calculator 21, within its memory. The address of the first ROM 24 is read out, and accessing is accomplished to the first ROM 24. In addition, the second ROM address calculator 33 also accesses the second ROM 25 in the same manner, and prepares the same results. When the decoded signal 2a of the plane 4 of the one prior reference pixel is fixed, then the processing results corresponding to the prepared [1E] is input into the latch circuit 34 notwithstanding its value, and is preserved. At this time its results are input into the arithmetic calculator 21. Also, if the coded data 2 of plane 1 is input into the arithmetic calculator 21, then the processing results relative to the address [1E] relating to the plane 1 of the degeneration state table mentioned previously, i.e., the parameters recorded in memory within the [1E] within the RAM 21, and the results read out from the first ROM 24 and the second ROM 25 are utilized, and the arithmetic calculator 21 outputs the decoded signal 2a.

In parallel with the conversion operation from the input of the coded data 2 to the output of the decoded signal 2a, RAM 22 and the first and second ROMs 24, 25, execute parallel processing to prepare the respective processing results for the cases in which the decoded signal 2a has a value "0", and value "1". In other words, with "0", when the first state signal PBP is [5], the CX becomes [A], and the address of RAM 22 becomes [1A]. Since ROM access is accomplished on the basis of the address [1A], then the first ROM 24 address calculation is accomplished by the first ROM address calculator 32. Also, the first ROM 24 is accessed on the basis of these results. As a result, the processing results corresponding to the address [1A] of RAM 22 from the first ROM 24 is obtained and prepared for next processing. On the other hand, for the case of value "1", the first state signal PBP is [5], which is the same as the case of value "0" and the CX becomes [B], and the address of the RAM 22 becomes [1B]. Because of this, since ROM accessing is accomplished on the basis of the address [1B], then address calculation is accomplished of the second ROM 25 by means of the second ROM address calculator 33, and accessing is accomplished of the second ROM 25. As a result, the processing results corresponding to the address [1B] from the second ROM 25 are obtained and prepared for the next processing. When the decoding signal 2a of the plane 1 is fixed, then its signal 2a is input into the latch circuit 34, and the access results of the first ROM 24 and the second ROM 25 are input into the latch circuit 34, where its value is preserved. At the same time, one of the two values, i.e., the processing result corresponding to the fixed value of the decoded signal 2a is input into the arithmetic calculator 21. In other words, if it is "0", then the processing result accomplished by the first ROM 24 is obtained, and if the decoded signal 2a is "1", then the processing result accomplished by the second ROM 25 is obtained. Then, the data needed for processing the next signal of plane 2 is confirmed. For example, if the coded signal 2a is "0", then the arithmetic calculator 21 obtains the processing result from the first ROM 24 on the basis of the address [1A], and utilizing the information, as well as the parameter data corresponding to the [1A] within the RAM 21, to efficiently decode the signal of the plane 2. On the other hand, if the decoded signal 2a of the plane 1 is fixed, then the ROM address to be accessed next is revised. For example, if the decoded signal of the plane expressed in the previous example is "0", then the ROM address recorded in memory within the address [1A] is overwritten based on the learning. In other words, when the [1A] is designated next time, then the address of the ROM having an improved, extension ratio is obtained.

During the restoration process of the plane 2, i.e., during the input of the coded data 2 of the plane 2 into the arithmetic calculator 21, for the restoration, the RAM 22 and ROMs 24, 25 respective are preparing the processing results in the first ROM 24, and the second ROM 25, respectively, for the cases in which the converted decoded signal 2a of the plane 2 is "0", and "1", respectively. Assuming that the decoding 2a of the PLANE 2 is "1", then as soon as the value "1" is fixed, the arithmetic calculator 21 obtains the result corresponding to the value "1" from the second ROM 25, which holds the result, through the latch circuit 34. At this time, the address, as shown in FIGS. 8–10, are grouped by the second state signal SX, becoming any of [3] [7] [B] [F] or [13]. This is because the state of [**01] is defined by plane 1 and plane 2, and because first state signal is [1], and CX becomes [3]. The processing results on the basis of this address are immediately entered into the arithmetic calculator 21, and utilized in the signal processing of the subsequent plane 3. If the decoding signal 2a of the plane 2 is "0", then when the first state signal is [1], the CX becomes [2], and the address obtained by means of the second state signal SX becomes any of [2] [6] [A] [E] or [12]. The first ROM 24 is accessed on the basis of these results.

In the conventional decoder, when converting the coded data 2 into a serial decoding signal 2a, a processing cycle is accomplished starting from the RAM 22, using one ROM and the arithmetic calculator 21 to decode the coded data 2, and once again rewriting the memory of RAM 22. Time is taken for this processing. However, in the embodiment, the processing extending from the prediction means 23 of the RAM 22 to ROM is processed in parallel, and during this parallel processing decoding processing is executed by the arithmetic calculator 21 concurrently. This allows the process to be accomplished in a half cycle of time. In other words, through the efficient activation of parallel processing which utilizes the first ROM address calculator 32 and the second ROM calculator 33 as well as the first ROM 24 and the second ROM 25, the processing results are prepared in advance by the two ROMs 24 and ROM 25 for the cases in which the decoded signal 2a of the arithmetic calculator is "0", and "1", respectively, on the basis of their respective addresses, by which the processing time is shortened.

The example described above is the preferred embodiment according to the present invention. However, it is not limited to this embodiment, and various changed states of execution are provided within parameters which do not remove the essentials of the present invention. For example, rather than having one pixel of a color pixel which is 4 bits of 16 colors, it may be 8 bits of 256 colors or some other multiple bit arrangement. In addition, data which comprises the object of data coding and data decoding is such that color pixel data is most desirable. However, it can also be utilized for other data, such as black and white pixel data etc. In addition, reference pixels are not limited to the three peripheral pixels. For example, immediately prior one and the peripheral two, or four pixels such as that shown in FIG. 12, or other pixels can be used. However, considering miniaturization or the compression ratio, then the three pixels explained in the shape of the above embodiment are desirable.

In the above embodiment, with a data decoding device, utilization is made up of two ROMs comprising the first ROM 24 and the second ROM 25. However, a single ROM, which is divided into two spaces, may be used. In addition, a ROM may be used, whose contents are changeable through learning, similar to the color chronological position converters 3, and 28. Utilization may also be made of a type which is capable of being written into and rewriting the internal contents in the equipment or by the user. In addition, the write capable ROM can be externally attached, and various types of shape change applications are capable which are preattached in parallel (column) and ordinary ROM.

In addition, as the data coding device, utilization may also be made of the data decoding device and reverse algorithms explained in the shape of the embodiment described above. In this instance, the data coding device may be made such that the same memory of and the data decoding device can be small and miniaturized. On the other hand, as a data decoding device, utilization may also be made of the data coding device and the reverse algorithm explained with the shape of the embodiment described above. Furthermore, when the data decoding device is the "handy type", then the data decoding device explained with the embodiment described above is desirable.

As explained above, with the data coding device, by means of each of the bits which are the object of coding, in other words through the existence of an offset of the probability of each plane generation, the object pixels at the time of coding, are such that the compression ratio can be made higher than with the prior art. As a result, the hardware can be miniaturized, and at the same time, when the data is being transmitted, the transmission time can be shortened.

In addition, through the utilization of the bias of the occurrence probability of each bit of input object coded data, when the object pixels are decoded, then the expansion efficiency can be made higher than with the prior art. As a result, the hardware can be miniaturized, and at the same time the picture image data speed can be increased.

Furthermore, utilization can be made of the offset of the generation probability of each bit of the object pixels to be coded, and at the time of coding the object pixels, the compression ratio can be made higher than with the prior art. As a result, the hardware utilized by this method can be miniaturized, and at the same time data compressed by means of this method can be transmitted to another piece of equipment in a short time.

In addition, utilization can be made of an offset of the generation probability of each bit of input object coded data, and when decoding the object pixels, the expansion ratio can be made higher than with the conventional art. As a result, the replication speed of the pixel data can be increased, and at the same time the hardware can be miniaturized utilizing the present invention.

In addition, the ROM is such that since the calculation results which are predicted prior to the confirmation of the bits can be prepared by means of parallel processing, owing to which if the bits are confirmed, then immediately the arithmetic calculator obtains the calculation results from ROM, thereby improving the speed of data decoding. Because of this, the quality of the decoded picture image data is improved, at the same time as which there is no need to make particular use of high cost and high speed ROM and RAM, and the hardware can be composed with ordinary RAM and ROM.

Furthermore, since utilization is made of the degeneration state table, the parameter table becomes smaller, and the data decoding device is miniaturized, at the same time as which it becomes lower in cost. In addition, utilization is made of the degenerated state table, and since the results are preobtained from the ROM, the expansion ratio is improved, at the same time as which the processing speed is also improved, and there is no enlargement of the RAM.

In addition, even if the immediately previous second state signal is not confirmed, then since it is confirmed as a specific item relative to the first state signal, even when the immediately previous reference pixel is not restored, then the precalculation of the ROM becomes possible, then the (parallel column) processing becomes possible within broad parameters. Because of this, the processing speed is increased, at the same time as which there is no need to use high cost high speed ROM or RAM, and a low cost data decoding device is made possible.

What is claimed is:

1. A data coding device for coding input object color pixel data into coded data, the input object color pixel data being parallel data of plural bits, comprising:

a parallel/serial converter that converts the parallel data into a serial data string;

a state signal generator that generates a state signal for each bit of the serial data string;

a prediction device which groups each bit of the serial data string based on the state signal; and an arithmetic calculator connected to the prediction device that converts the color pixel data into coded data based on data received from the prediction device.

2. A data decoding device for decoding input object coded data into color pixel data having plural bits of serial data, comprising:

a serial/parallel converter which converts the serial data into parallel data of multiple bits;

a state signal generator that generates a state signal for each bit of serial data input into the serial/parallel converter;

a prediction device that groups each bit of the serial data based on the state signal; and an arithmetic calculator connected to the prediction device that decodes the input object coded data into the color pixel data based on data from the prediction device.

3. A data coding method for coding input object color pixel data into coded data, the input object color pixel data being parallel data of plural bits, comprising:

inputting the parallel data into a parallel/serial converter to convert the parallel data into a serial data string;

generating a state signal for each bit of the serial data string;

grouping each bit of the serial data string based on the state signal; and converting the object color pixel data into coded data based on the grouping of each bit of the serial data.

4. A decoding method for decoding input object coded data into color pixel data having plural bits of serial data, comprising:

inputting each of the bits of serial data into a serial/parallel converter and converting the serial data into parallel data;

generating a state signal for each bit of the serial data input into the serial/parallel converter;

grouping each bit of the serial data based on the state signal; and decoding the input object coded data into color pixel data based on the grouping of each bit of the serial data.

5. A data decoding device which decodes input object coded data into color pixel data by means of an entropy decoding device, wherein the entropy decoding device comprises:

an arithmetic calculator which decodes the input object coded data into a decoded signal having a value of "1" or "0";

a RAM that receives the decoded signal from the arithmetic calculator and outputs a calculation instruction based on the received signal value;

a ROM address calculator that executes multiple ROM address calculations in parallel in response to the calculation instruction received from the RAM; and a ROM that is accessed based on the calculation results of the ROM address calculator, and that outputs a result determined by a subsequent decoded signal to the arithmetic calculator.

6. A data decoding method which decodes input object coded data into color pixel data by means of an entropy decoding process, comprising:

generating a state signal having a value of "1" or "0" with an arithmetic calculator based on the input object coded data;

accessing a RAM on the basis of the state signal;

calculating a ROM address for a subsequently decoded signal;

accessing a ROM address on the basis of the ROM address calculation results;

inputting data from the accessed ROM address to the arithmetic calculator when a subsequent decoded signal is specified; and decoding subsequent input object coded data based on the data from the accessed ROM address.

7. A data decoding device for decoding input object coded data into color pixel data having plural bits of serial data, comprising:

a serial/parallel converter which converts the serial data into parallel data of multiple bits;

a first state signal generator that generates a first state signal for each bit of the serial data input into the serial/parallel converter;

a second state signal generator that receives reference peripheral pixel information including at least the previous decoded pixel data, and groups the states of the reference pixels to generate a second state signal; and a degenerated state table generator for forming a degeneration table in which the second state signals, which correspond to the first state signals having a low probability of occurrence, are abbreviated into a single state based on the first and second state signals.

8. A data decoding device according to claim 7, further comprising:

an arithmetic calculator that receives and decodes the input object coded data;

a RAM having the degeneration table that receives a signal from the arithmetic calculator and outputs a calculation instruction for a subsequent decoded signal on the basis of the address of the degeneration table determined by the signal from the arithmetic calculator;

a ROM address calculator that calculates multiple ROM addresses in response to the calculation instruction from the RAM; and a ROM which is accessed by the ROM address calculator, and outputs an access result corresponding to the value of a next decoding signal to the arithmetic calculator.

9. A data decoding device according to claim 8, wherein the degeneration table is formed from an abbreviation of the second state signals to a single state corresponding to the first state signal, to decode initial bits of each color pixel data.

* * * * *